(12) United States Patent
Ben-Natan

(10) Patent No.: US 7,933,923 B2
(45) Date of Patent: Apr. 26, 2011

(54) TRACKING AND RECONCILING DATABASE COMMANDS

(75) Inventor: Ron Ben-Natan, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 11/267,387

(22) Filed: Nov. 4, 2005

(65) Prior Publication Data

US 2007/0112864 A1    May 17, 2007

(51) Int. Cl.
*G06F 17/30* (2006.01)
(52) U.S. Cl. .......................................................... 707/781
(58) Field of Classification Search .............. 707/1, 202, 707/6, 781
See application file for complete search history.

(56) References Cited

U.S. PATENT DOCUMENTS

| | | |
|---|---|---|
| 4,451,916 A | 5/1984 | Casper et al. |
| 4,611,205 A | 9/1986 | Eglise |
| 4,672,572 A | 6/1987 | Alsberg |
| 4,956,769 A | 9/1990 | Smith |
| 5,224,058 A | 6/1993 | Mickaels |
| 5,261,102 A | 11/1993 | Hoffman |
| 5,299,257 A | 3/1994 | Fuller et al. |
| 5,325,290 A | 6/1994 | Cauffman et al. |
| 5,355,474 A | 10/1994 | Thuraisngham et al. |
| 5,557,742 A | 9/1996 | Smaha et al. |
| 5,594,899 A | 1/1997 | Knudsen et al. |
| 5,606,668 A | 2/1997 | Shwed |
| 5,701,342 A | 12/1997 | Anderson et al. |
| 5,737,316 A | 4/1998 | Lee |
| 5,758,083 A | 5/1998 | Singh et al. |
| 5,825,772 A | 10/1998 | Dobbins et al. |
| 5,826,267 A | 10/1998 | McMillan |
| 5,828,666 A | 10/1998 | Focsaneanu et al. |
| 5,835,726 A | 11/1998 | Shwed et al. |
| 5,845,281 A | 12/1998 | Benson et al. |
| 5,848,233 A | 12/1998 | Radia et al. |

(Continued)

FOREIGN PATENT DOCUMENTS

WO    98/31124 A1    7/1998

(Continued)

OTHER PUBLICATIONS

Lunt et al., "IDES: A Progress Report," IEEE, 1990.

(Continued)

*Primary Examiner* — James Trujillo
*Assistant Examiner* — Amresh Singh
(74) *Attorney, Agent, or Firm* — Terry J. Carroll, SVL; IP Law

(57) ABSTRACT

A method for automatic reconciliation of database change requests associates administrative database commands with the change request via a context event command. A database monitoring system identifies a context event command that indicates that a particular context, or session, is beginning. The context event command is a tag command, and includes parameters specifying a context label indicative of a change request. Prior to entering a particular change request, the DBA issues the context event command with the context label as a parameter. The context label is an identifier of the change request to be associated with the set of operations, or commands, resulting from the particular change request. The database monitoring system logs and associates subsequently received commands with the context label in a database access log which is employed for later reconciliation of the operations with the corresponding change request.

23 Claims, 7 Drawing Sheets

U.S. PATENT DOCUMENTS

| | | |
|---|---|---|
| 5,881,225 A | 3/1999 | Worth |
| 5,884,025 A | 3/1999 | Baehr et al. |
| 5,953,707 A | 9/1999 | Huang et al. |
| 5,963,642 A | 10/1999 | Goldstein |
| 5,974,396 A | 10/1999 | Anderson et al. |
| 5,978,788 A | 11/1999 | Castelli et al. |
| 5,978,813 A | 11/1999 | Foltz et al. |
| 6,009,475 A | 12/1999 | Shrader |
| 6,016,491 A | 1/2000 | Kou |
| 6,044,376 A | 3/2000 | Kurtzman, II |
| 6,049,821 A | 4/2000 | Theriault et al. |
| 6,052,447 A | 4/2000 | Golden et al. |
| 6,061,797 A | 5/2000 | Jade et al. |
| 6,070,243 A | 5/2000 | See et al. |
| 6,075,926 A | 6/2000 | Atkins et al. |
| 6,076,168 A | 6/2000 | Fiveash et al. |
| 6,081,900 A | 6/2000 | Subramaniam et al. |
| 6,085,191 A | 7/2000 | Fisher et al. |
| 6,088,796 A | 7/2000 | Cianfrocca et al. |
| 6,097,399 A | 8/2000 | Bhatt et al. |
| 6,105,027 A | 8/2000 | Schneider et al. |
| 6,119,236 A | 9/2000 | Shipley |
| 6,122,403 A | 9/2000 | Rhoads |
| 6,125,447 A | 9/2000 | Gong |
| 6,151,601 A | 11/2000 | Papierniak et al. |
| 6,192,476 B1 | 2/2001 | Gong |
| 6,205,475 B1 | 3/2001 | Pitts |
| 6,226,749 B1 | 5/2001 | Carloganu et al. |
| 6,230,156 B1 | 5/2001 | Hussey |
| 6,253,321 B1 | 6/2001 | Nikander et al. |
| 6,272,641 B1 | 8/2001 | Ji |
| 6,279,010 B1 | 8/2001 | Anderson |
| 6,298,327 B1 | 10/2001 | Hunter et al. |
| 6,304,975 B1 | 10/2001 | Shipley |
| 6,311,272 B1 | 10/2001 | Gressel |
| 6,330,562 B1 | 12/2001 | Boden et al. |
| 6,332,163 B1 | 12/2001 | Bowman-Amuah |
| 6,336,996 B1 | 1/2002 | Steiner |
| 6,341,312 B1 | 1/2002 | French et al. |
| 6,347,374 B1 | 2/2002 | Drake et al. |
| 6,347,376 B1 | 2/2002 | Attwood et al. |
| 6,356,941 B1 | 3/2002 | Cohen |
| 6,366,952 B2 | 4/2002 | Pitts |
| 6,393,568 B1 | 5/2002 | Ranger et al. |
| 6,442,748 B1 | 8/2002 | Bowman-Amuah |
| 6,460,046 B1 | 10/2002 | Meek |
| 6,480,861 B1 | 11/2002 | Kanevsky et al. |
| 6,496,850 B1 | 12/2002 | Bowman-Amuah |
| 6,505,241 B2 | 1/2003 | Pitts |
| 6,529,909 B1 | 3/2003 | Bowman-Amuah |
| 6,529,948 B1 | 3/2003 | Bowman-Amuah |
| 6,532,465 B2 | 3/2003 | Hartley et al. |
| 6,550,057 B1 | 4/2003 | Bowman-Amuah |
| 6,539,396 B1 | 5/2003 | Bowman-Amuah |
| 6,578,068 B1 | 6/2003 | Bowman-Amuah |
| 6,581,052 B1 | 6/2003 | Slutz |
| 6,601,192 B1 | 7/2003 | Bowman-Amuah |
| 6,606,660 B1 | 8/2003 | Bowman-Amuah |
| 6,609,123 B1 | 8/2003 | Cazemier et al. |
| 6,615,253 B1 | 9/2003 | Bowman-Amuah |
| 6,633,936 B1 | 10/2003 | Keller et al. |
| 6,636,585 B2 | 10/2003 | Salzberg et al. |
| 6,658,091 B1 | 12/2003 | Naidoo et al. |
| 6,658,625 B1 | 12/2003 | Allen |
| 6,678,355 B2 | 1/2004 | Eringis et al. |
| 6,681,331 B1 | 1/2004 | Munson et al. |
| 6,687,702 B2 | 2/2004 | Vaitheeswaran et al. |
| 6,694,368 B1 | 2/2004 | An et al. |
| 6,714,778 B2 | 3/2004 | Nykanen et al. |
| 6,789,046 B1 | 9/2004 | Murstein et al. |
| 6,807,546 B2 | 10/2004 | Young-Lai |
| 6,820,082 B1 | 11/2004 | Cook et al. |
| 6,842,105 B1 | 1/2005 | Henderson et al. |
| 6,851,004 B2 | 2/2005 | Keller et al. |
| 6,941,369 B1 | 9/2005 | Krack et al. |
| 6,941,472 B2 | 9/2005 | Moriconi et al. |
| 7,038,611 B2 | 5/2006 | Gounalis |
| 7,043,541 B1 | 5/2006 | Bechtolsheim et al. |
| 7,080,077 B2 | 7/2006 | Ramamurthy et al. |
| 7,085,834 B2 | 8/2006 | Delany et al. |
| 7,089,322 B1 | 8/2006 | Stallmann |
| 7,111,059 B1 | 9/2006 | Garcea et al. |
| 7,171,413 B2 | 1/2007 | Puz et al. |
| 7,231,378 B2 | 6/2007 | Lawson et al. |
| 7,248,568 B1 | 7/2007 | Loc et al. |
| 7,308,388 B2 | 12/2007 | Beverina et al. |
| 7,337,105 B2 | 2/2008 | Sugimoto |
| 7,342,896 B2 | 3/2008 | Ayyagari |
| 7,426,512 B1 | 9/2008 | Ben-Natan |
| 7,437,362 B1 | 10/2008 | Ben-Natan |
| 7,506,371 B1 | 3/2009 | Ben-Natan |
| 7,567,819 B2 | 7/2009 | Alone et al. |
| 7,694,134 B2 | 4/2010 | Witt et al. |
| 2002/0007363 A1 | 1/2002 | Vaitzblit ................ 707/202 |
| 2002/0010800 A1 | 1/2002 | Riley et al. |
| 2002/0019944 A1 | 2/2002 | Kou |
| 2002/0027907 A1 | 3/2002 | Tateoka |
| 2002/0059451 A1 | 5/2002 | Haviv |
| 2002/0066033 A1 | 5/2002 | Dobbins et al. |
| 2002/0066038 A1 | 5/2002 | Mattsson et al. |
| 2002/0078384 A1 | 6/2002 | Hippelainen |
| 2002/0095496 A1 | 7/2002 | Antes et al. |
| 2002/0095603 A1 | 7/2002 | Godwin et al. |
| 2002/0104017 A1 | 8/2002 | Stefan |
| 2002/0129140 A1 | 9/2002 | Peled et al. |
| 2002/0129271 A1 | 9/2002 | Stanaway et al. |
| 2002/0133723 A1 | 9/2002 | Tait |
| 2002/0147726 A1 | 10/2002 | Yehia et al. |
| 2002/0147927 A1 | 10/2002 | Tait |
| 2002/0152399 A1 | 10/2002 | Smith |
| 2002/0154646 A1 | 10/2002 | Dubois et al. |
| 2002/0157020 A1 | 10/2002 | Royer |
| 2002/0177910 A1 | 11/2002 | Quarterman et al. |
| 2003/0028624 A1 | 2/2003 | Hasan et al. |
| 2003/0046302 A1 | 3/2003 | Miron |
| 2003/0056200 A1 | 3/2003 | Li et al. |
| 2003/0084320 A1 | 5/2003 | Tarquini et al. |
| 2003/0084328 A1 | 5/2003 | Tarquini et al. |
| 2003/0182580 A1 | 9/2003 | Lee |
| 2003/0217069 A1 | 11/2003 | Fagin et al. |
| 2004/0024764 A1 | 2/2004 | Hsu et al. |
| 2004/0093506 A1 | 5/2004 | Grawrock et al. |
| 2004/0111344 A1 | 6/2004 | Fetter et al. |
| 2004/0111623 A1 | 6/2004 | Miller et al. |
| 2004/0117037 A1 | 6/2004 | Hinshaw et al. |
| 2004/0143733 A1 | 7/2004 | Ophir et al. |
| 2004/0255301 A1* | 12/2004 | Turski et al. .................. 719/316 |
| 2004/0260947 A1 | 12/2004 | Brady et al. |
| 2005/0005031 A1 | 1/2005 | Gordy et al. |
| 2005/0071650 A1 | 3/2005 | Jo et al. |
| 2005/0086529 A1 | 4/2005 | Buchsbaum |
| 2005/0097149 A1* | 5/2005 | Vaitzblit et al. ............... 707/202 |
| 2005/0149537 A1 | 7/2005 | Balin et al. |
| 2005/0203921 A1 | 9/2005 | Newman et al. |
| 2006/0059154 A1 | 3/2006 | Raab |
| 2006/0242431 A1 | 10/2006 | LeCrone et al. |
| 2007/0180275 A1 | 8/2007 | Metzger et al. |
| 2008/0011843 A1 | 1/2008 | Barenburg et al. |
| 2009/0271453 A1 | 10/2009 | Ben-Natan |
| 2010/0131512 A1* | 5/2010 | Ben-Natan et al. ........... 707/741 |
| 2010/0131758 A1* | 5/2010 | Ben-Natan .................... 713/166 |
| 2010/0132024 A1* | 5/2010 | Ben-Natan et al. ............... 726/9 |

FOREIGN PATENT DOCUMENTS

WO        99/66384 A2     12/1999

OTHER PUBLICATIONS

Jones Katherine, "Secure Internet Access to SAP's R/3: Keeping Dragons Out," Int. J. Network Mgmt., vol. 8 © 1998, pp. 191-199.

Joshi, James B. D., et al., "Security Models for Web-Based Applications," Communications of the ACM, vol. 44, No. 2, Feb. 2001, pp. 38-44.

Muller, Nathan J., "Improving Network Operations With Intelligent Agents," Int. J. Network Mgmt., vol. 7, © 1997, pp. 116-126.

Jaeger, T., et al., "Flexible Access Control Using IPC Redirection,"

Proc. of the 7th Workshop on Hot Topics in Operating Systems, Mar. 29-30, 1999, pp. 191-196.

Roscheisen, Martin, et al., "A Communication Agreement Framework for Access/Action Control," 1996 IEEE Symposium on Security and Privacy, © 1996, pp. 154-163.

Appenzeller, Guido, et al., "User-Friendly Access Control for Public Network Ports," IEEE 0-7803-5417-6/99, © 1999, pp. 699-707.

Balasubramaniyan, Jai Sundar, et al., "An Architecture for Intrusion Detection Using Autonomous Agents," 14th Annual Computer Security Applications Conf. Proc., Phoenix, AZ, Dec. 7-11, 1998, pp. 13-24.

Gangadharan, Muralidaran, et al., "Intranet Security with Micro-Firewalls and Mobile Agents for Proactive Intrusion Response," IEEE Int'l Conf. on Computer Networks and Mobile Computing, Beijing, China, Oct. 16-19, 2001, pp. 325-332.

Miller, Sandra Kay, "The Trusted OS Makes a Comeback," Computer, vol. 34, Issue 2, Feb. 2001, pp. 16-19.

Microsoft Computer Dictionary, 5th Edition, Microsoft Press, Redmond WA, © 2002, p. 22.

Chari, Suresh N., et al., "BlueBoX: A Policy-Driven, Host-Based Intrusion Detection System," ACM Transactions on Information and System Security, vol. 6, No. 2, May 2003, pp. 173-200.

Schepers, Filip, et al., "Network-Versus Host-Based Intrusion Detection," Information Security Technical Report, vol. 3, Issue 4, © 1998, pp. 32-42.

Levine, John, et al., "The Use of Honeynets to Detect Exploited Systems Across Large Enterprise Networks," Proc. of the 2003 IEEE Workshop on Information Assurance, West Point, NY, Jun. 18-20, 2003, pp. 92-99.

Kewley, Dorene L., et al., "DARPA Information Assurance Program Dynamic Defense Experiment Summary," IEEE Transactions on Systems, Man and Cybernetics—Part A: Systems and Humans, vol. 31, No. 4, Jul. 2001, pp. 331-336.

Ron Ben Natan, Implementing Database Security and Auditing: A Guide for DBAs, information security administrators and auditors, Elsevier Digital Press (May 2, 2005) pp. 95-108, 177-201, 242-266, 278-293, 324-326, 340-391.

Newman, Aaron, Security Auditing in Microsoft SQL Server (Nov. 3, 2005) [retrieved from http://web.archive.org./ web/20051227161250/www.appsecinc./presentations/Security_Auditing_MSSQL.pdf on Apr. 6, 2010].

Applicaton Security, Inc. AppRadar User Guide (Nov. 3, 2005) [retrieved from http://web.archive.org. web/20050204172218/http://www/appsecinc.com/techdocs/AppDetectiveUG.pdf on Apr. 5, 2010].

Guardium Press Release, "Guardium Introduces SQL Guard" (Feb. 9, 2004) [retrived from http://www.guardium.com/index.php/prprint/390 on Mar. 19, 2010].

Webster's II New College Dictionary. Houghton Mifflin Co. (1995). p. 231.

Deri, L; Carbone R; Suin, S. Monitoring Networks Using Ntop (2001) [Retrieved from http://citeseer.ist.psu.edu/old/414959.html on Apr. 7, 2010].

Roesch, Martin. SNORT—Lightweight Intrusion Detection for Networks. Proceedings of LISA '99 13th Systems Administration Conference (Nov. 7-12, 1999) pp. 229-238 [retrieved from http://www.unenix.org on Apr. 6, 2010].

Silberzchatz, A; Korth, H.; Sudarshan, S. Database System Concept. 5th Edition. McGraw-Hill Publishing (May 17, 2005) pp. 934-936, 1078-1079.

Guardium, Inc. Auditing, Compliance, and Privacy Through Effective Controls on Data Access and Usage (Mar. 22, 2005) [retrieved from http://guardium.com on Apr. 6, 2010].

Dar et al., "dbSwitchtm: towards a database utility," Proceedings of the 2004 ACM SIGMOD international conference on Management of data, Jun. 2004 P-892-896. Retrived from the Internet <URL:http//portal.acm.org/ft_gateway.cfm?id=1005726&type=pdf&coll=ACM&CFID=59243114&CFTOKEN=20435778>.

Feamster et al., "A model of BGP routing for network engineering," Proceedings of the joint international conference on Meaurement and Modeling of computer systems, Jun. 2004, P-331-342. Retrieved from the internet:URL: http://portal.acm.org/ft_gateway.cfm?id=1005726&type=pdf&coll=ACM&dl=ACM&CFID=59243114&CFTOKEN=20435778>.

SQL Guard Version 4.0.2 User Guide, Aug. 18, 2005.

SGL Guard Version 4.0.2 Adminstrator Guide, Aug. 18, 2005.

User Guide for SQL Guard Version 5.1, Jul. 14, 2006.

Administrator Guide for SQL Guard Version 5.1, Jul. 21, 2006.

* cited by examiner

US 7,933,923 B2

TRACKING AND RECONCILING DATABASE COMMANDS

BACKGROUND

In a managed information environment, users typically access a mass storage subsystem, such as one or more databases (DBs) for various data items used in the normal course of business operations. Often, it is desirable to monitor and oversee transactions occurring with respect to data base access. Monitoring of the databases access transactions can identify potential security breaches, inappropriate usage of sensitive information, track usage trends to assist with resource planning and accounting chargebacks, and provide continuous tracking of access to sensitive data for government mandated auditing and regulatory compliance.

Database transaction tracking and monitoring may occur at the system level, as users attempt to gain access, or at the data level, as types of data sought for access are scrutinized. Data level security provides more specific control and recognition over data access, as database transactions are qualitatively analyzed, rather then permitting unconstrained access over large portions typically afforded by privilege and access based mechanisms. However, conventional data level security reporting mechanisms typically coexist with database server applications on a target machine. Therefore, these mechanisms impose additional processes or threads on the target machine. The additional processes or threads tend to consume computational resources of the target machine, slowing overall response. Such conventional mechanisms are typically required to receive and examine every database access attempt, further impeding database performance.

Accordingly, some systems employ nonintrusive data level database access monitoring techniques. Nonintrusive access monitoring resides in a separate computing device in communication with an access path, such as an Ethernet cable or other network access path, between the users and the database server. Such nonintrusive devices observe database access requests (transactions) in a passive manner during transport from the user to the database server. Accordingly, a database monitor device intercepts, or "sniffs" these transactions "over the wire," in a nonintrusive manner to gather the database transactional data via an offloaded processor which does not impede database access or compete with database servers for available CPU cycles.

BRIEF SUMMARY

In a large managed information environment, a data access resource such as a so-called "server farm," storage area network, or other mass storage management mechanism provides data storage and retrieval services to a user community. Accordingly, a managed information environment often employs data level access reporting mechanisms for monitoring and managing data exchanges such as database accesses by the user community. Typically, the data reporting mechanisms are employed for identifying trends and access patterns which are indicative of undesirable, unproductive, or illegal usage. While these transactional access records are effective for such security purposes, the same transactional data is often beneficial for generating reports for regulatory compliance and auditing purposes. Such oversight is therefore beneficial not only for security purposes, but also for compliance verification with various government mandated IT governance initiatives, such as Sarbanes-Oxley (SOX) compliance, HIPAA, SB1386 and GLBA, to name several. Accordingly, transactional data generated for security and oversight monitoring purposes serves dual duty by also providing data gathering for required administrative purposes such as government mandated auditing and reporting.

Conventional data access environments monitor and track administrative changes to the database. Administrative changes or changes to data are made by commands and typically include metadata and data changes or other organizational and/or administrative specifications such as schema definition, database views, and data types, to name several. In the conventional data access environment, a change request specifies the administrative result or data modification to be made to the database tables, organization or data. A database operator such as a DBA or a developer who implements the change request via a series of commands to the database, usually for updating and/or modifying database metadata such as schemas. The commands perform database operations that implement the change request. Due to the regulatory compliance schemes outlined above, such administrative changes are tracked for reconciliation so that an audit trail back to the implementing DBA is established. The commands are periodically reconciled with the change request that prompted them. The reconciliation procedure flags discrepancies between commands and corresponding change requests for further investigation and verification.

Unfortunately, conventional tracking and reconciliation mechanisms suffer from several shortcomings. Conventional reconciliation typically involves manual identification of logged database commands with the change request that prompted them. In particular arrangements, such a procedure may include a so-called "paper interface" which involves visual inspection of the issued commands. The visual inspection correlates the DBAs which may have issued such commands with the change requests which they emanated from. Further, conventional mechanisms for monitoring commands rely on database auditing and tracing features internal to the monitored database management system (DBMS), which imposes overhead and increases reliance on the underlying DBMS. Accordingly, conventional mechanisms for reconciling change requests with the set of database operations, or commands, which prompted them are time consuming and operator reliant, which may be prone to inconsistent enforcement, time lags and human error.

Configurations of the invention are base, in part, on the observation that reconciliation of administrative database commands with the change request that prompted the command (e.g. database operation) is a cumbersome and unwieldy procedure. Accordingly, configurations disclosed herein substantially overcome the above described shortcomings by providing a nonintrusive database command reconciliation process which passively monitors database access requests for candidate commands, and automatically associates the commands with the change request that initiated the command.

Change requests typically include a set of commands, or DB operations. Configurations discussed further below associate administrative database commands with the change request via a context event command. The database monitoring system identifies a command that indicates that a particular context, or session, is beginning. The context event command acts as a tag command, and includes parameters specifying a context label. The database monitoring system logs and associates subsequently received commands with the context label in a database access log which is employed for later reconciliation of the operations with the corresponding change request.

Prior to entering a particular change request, the DBA issues the context event command with the context label as a parameter. The context label is an identifier of the change request to be associated with the set of operations, or commands, resulting from the particular change request. Each successive operation corresponding to the change request is issued as an command intercepted by the database monitoring system. The database monitor associates successive commands to the change request by logging the context label with each respective logged operation. The context label therefore acts as a change request identifier to the initiating change request. Further, the commands to commence and terminate the context event logging can be benign commands which are interpreted by the database as null operations, and therefore do not cause undesirable operation or consume needless processing overhead by the database server. In the exemplary configuration, therefore, the set of operations comprising a change request is encapsulated between a pair of context event commands including begin tag command and an end tag command, therefore defining a change request session. The commands fulfilling the change request are nested within the context of the change request session by associating the context label in the log with each logged command. Subsequent change requests receive a different context label and the DBA issues another begin tag command, typically in another context label session, for logging subsequent operations sets with the context label of the corresponding change request.

In further detail, the method for automatic reconciliation of change request includes intercepting, in a nonintrusive manner or by using database logs, database requests, and identifying, in one of the intercepted database requests, a tag command indicative of a session context applicable to subsequently received database requests. The database monitor extracts a context label from the identified tag command, such that the context label is operable to identify a session corresponding to a change request. The database monitor continues capturing successively received database requests for the duration of the session context to which the context label applies, and associates the captured database requests with the extracted context label.

The database requests include at least one of marking commands operable to effect context changes, and data traffic requests operable to effect updates and retrievals of stored database entities. The database monitor distinguishes the marking command from data traffic requests, in which the marking command are operable to manipulate context and the data traffic requests are operable to update and retrieve stored data. In a context session, the database monitor receives a plurality of commands corresponding to the same change request, such the plurality of commands define the session of the change request. The database monitor employs the database access log to associate each of the commands in the set of captured commands with the same context label. In the exemplary configuration, associating further comprises appending the context label to successively captured records indicative of successive database requests In the exemplary arrangement, to avoid unnecessarily burdening mainstream database traffic and to avoid changes to the database environments, the tag command is included in a database syntax of commands receivable as database requests by the DBMS in the database server. The DBMS receiving the tag command at a command interpreter in the database server, can discard the tag command in a benign manner as a null operation.

Upon issuance of all commands corresponding to a change request, the database monitor receiving an end tag command to terminate the association of the context label with successively captured commands. This achieves automated reconciliation of the captured commands with a change request corresponding to the extracted context label.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE SEVERAL VIEWS OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations of the invention disclosed herein provide a database command reconciliation process which monitors database access requests for candidate commands, and automatically associates the marking commands with the change request that initiated the command. Change requests typically comprise a set of commands, or DB operations. The arrangements discussed further below associate administrative database commands with the change request via a context event command. The database monitoring system identifies a context event command that indicates that a particular context, or session, is beginning. The context event command is a command which acts as a tag command, and includes parameters specifying a context label (i.e. change request identifier). The database monitoring system logs and associates subsequently received commands with the context label in a database access log which is employed for later reconciliation of the operations with the corresponding change request.

Figure 1:
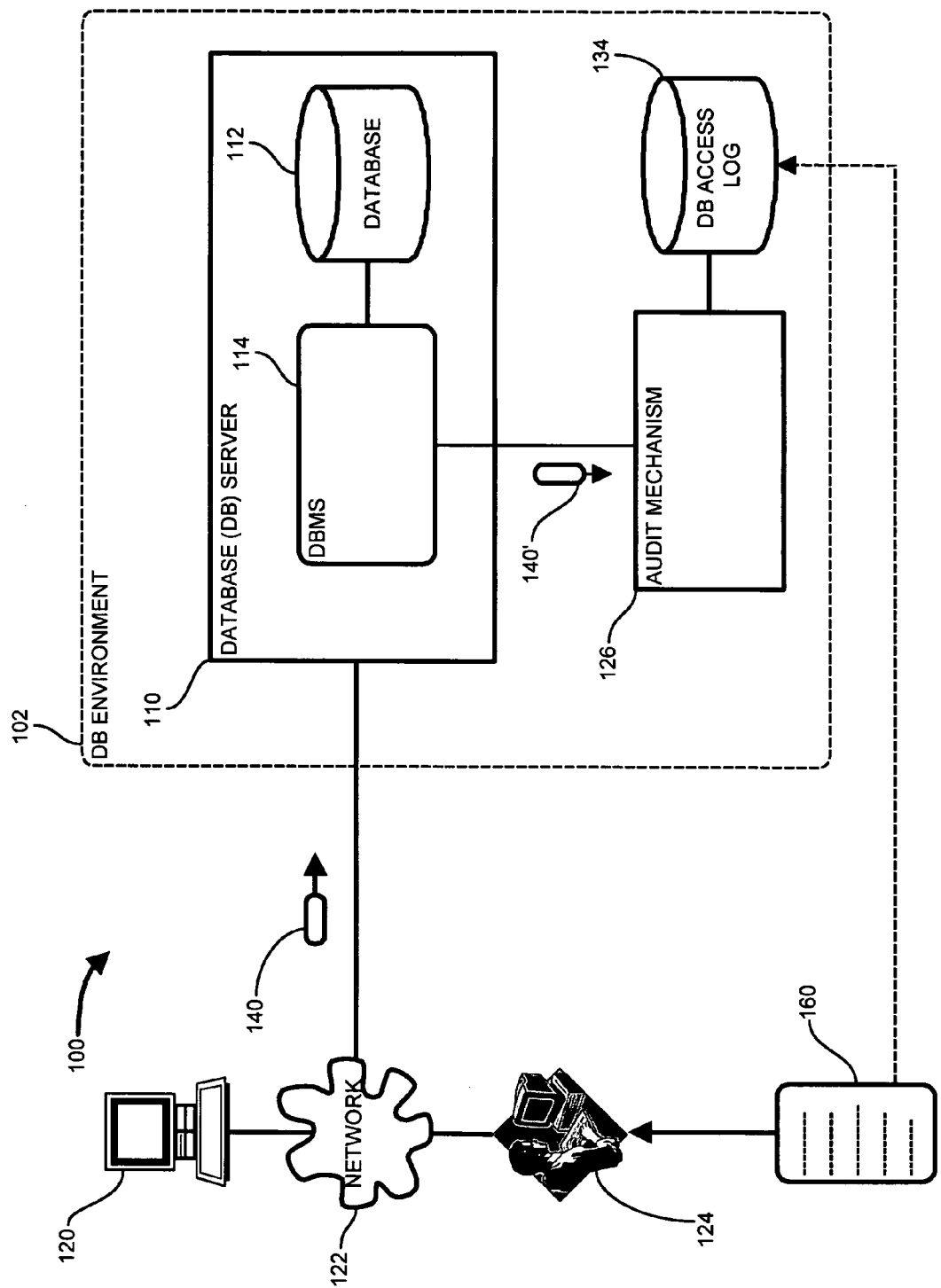
FIG. 1 is a context diagram of an exemplary managed information environment having a database audit mechanism suitable for use with the present invention

Prior to entering a set of administrative or data modifying commands comprising (corresponding to) a particular change request, the DBA issues the context event command with the context label as a parameter. The context label is an identifier of the change request to be associated with the set of operations, or commands, comprising the particular change request. Each successive operation corresponding to the change request is issued as a command logged by the database monitoring system or by the DBMS itself. The database monitor associates successive commands to the change request by logging the context label with each respective logged operation (command). The context label therefore acts as a change request identifier to the initiating change request. Further, the commands to commence and terminate the context event logging can be benign commands which are interpreted by the database as null operations, and therefore do not cause undesirable operation or consume needless processing overhead by the database server. In the exemplary configuration, therefore, the set of operations resulting from a change request is encapsulated between a pair of context event commands including begin tag command and an end tag command, therefore defining a change request session. The commands fulfilling the change request are nested within the context of the change request session by including the context label in the log with each logged command FIG. 1 is a context diagram of an exemplary managed information environment 100 having a database environment 102 including a database audit mechanism 126 suitable for use with the present invention. Referring to FIG. 1, the database environment includes one or more database servers 110 connected to one or more databases 112, typically relational databases having tables operable for Structured Query Language (SQL) response. A database management system DBMS 114 is responsive to the data access requests 140 for performing the desired operations on the database 112. The database is accessible via a network 122 by users 120 and DBAs 124 for issuing data access requests 140. In the database environment 102, an audit mechanism 126 receives audited requests 140' reflecting the data access requests 140 received by the DB environment 102 which may include the database server 110 and the audit mechanism 126 in a variety of physical arrangements. Further, the audit mechanism 126 may receive the audited requests according to several methods, such as reading the requests 140 from the DBMS, retrieving them from the database 112, or receiving them from the network 122 upon entering the database environment 102. The audit mechanism 126 stores the audited requests in a DB access log 134 operable for further processing. In a particular configuration, the DB access log 134 stores audited requests 140' for later reconciliation with a change request 160, as will now be discussed in further detail.

Figure 2:
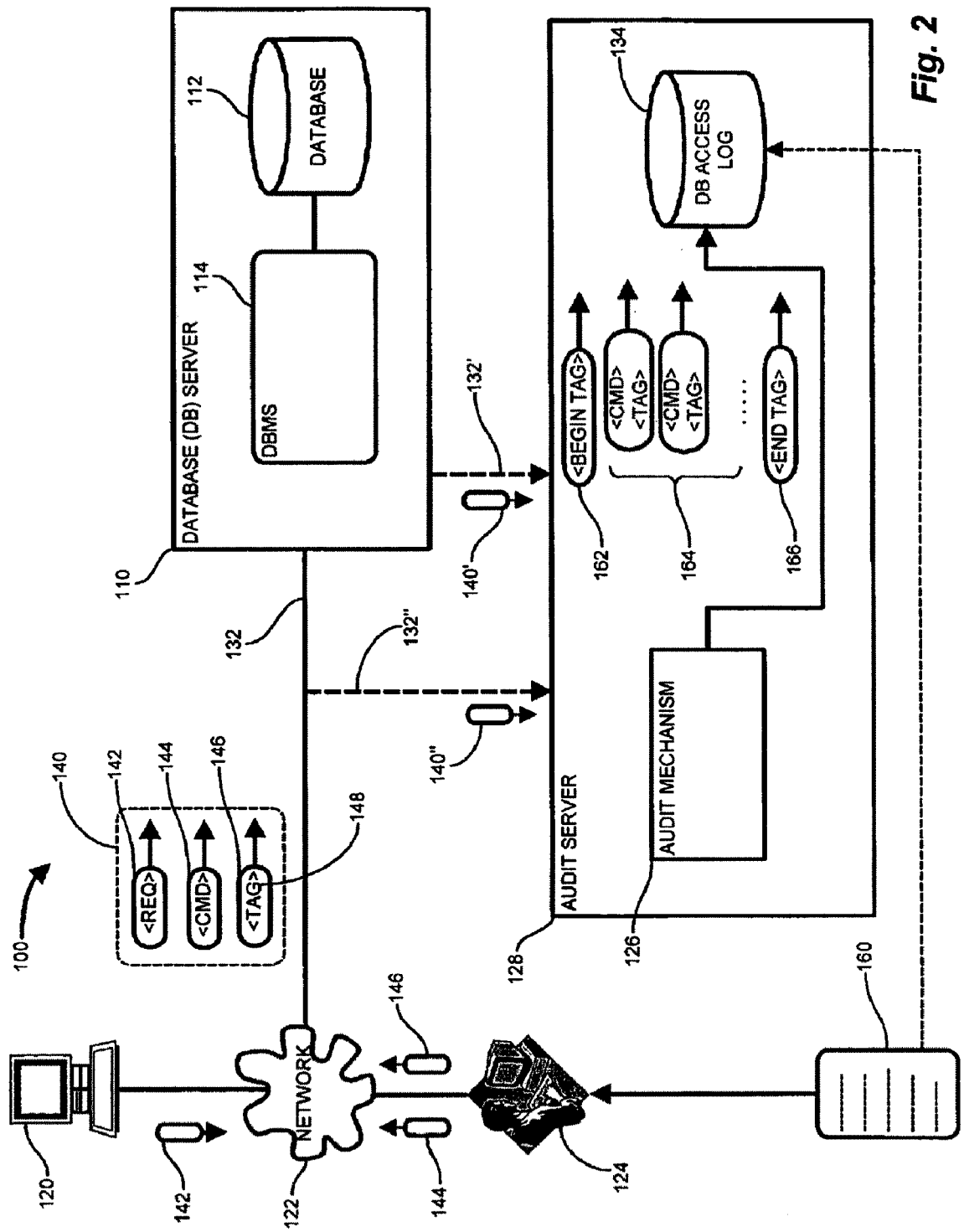
FIG. 2 is a data flow diagram of an exemplary managed information environment having an audit server suitable for use with the present invention.

FIG. 2 is a data flow diagram of an exemplary managed information environment having an audit server 128 suitable for use with the present invention. Referring to FIG. 2, the managed information environment 100 includes a database server 110 having a database 112, and a database management system (DBMS) 114. The database 112 is typically a relational database having a set of tables (not specifically shown) on one or more physical storage volumes such as disk drives, and accessible via the structured query language (SQL), as is known in the art. A plurality of users 120 connect to the DB server 110 via a network 122, which may be a local area network (LAN), wide area network (WAN), virtual private network (VPN), direct connection, or a combination of these such as the Internet. A plurality of database administrators (DBA) 124 also connects to the database server 110 via the network for providing administrative support and maintenance for database server 110 operations.

The audit server 128 includes the audit mechanism 126 for processing, organizing, and storing the audited requests 140'. The audit server 128 may receive the audited transactions from the DBMS 114 via an audit feature in the DBMS (not specifically shown), or directly from the interface 132 from the network 122 to the database server, shown by dotted lines 132' and 132" respectively.

Audit processing in a database environment 102 is common in response to auditing and regulator mandates discussed above. Accordingly, the audit server 128 may take one of several forms, and may be physically separate from the database server 110 or may be collocated. Therefore, the audit mechanism 126 is a process or set of instructions which receives data access requests 140 in the form of an audited request 140', 140", for processing and storage in the DB access log 134 according to the relevant audit compliance guidelines, discussed further below.

In a particular configuration, the audit mechanism 128 is a database monitor 130, discussed further below with respect to FIG. 4. In such a configuration, the database monitor 130 is disposed along the connection interface 132 between the database server 110 and the network 122 for performing nonintrusive monitoring and scrutiny of data access requests 140 to the database 112. Nonintrusive monitoring, as indicated above, includes intercepting data access requests 140 to the database server 110 for analysis and logging while still permitting the data access request to continue to the database server such that the access performance is not impeded, as shown by audited requests 140". The audit mechanism 126, such as the database monitor 130, connects to a DB access log 134 for accumulating the information about monitored access requests 140. In the particular exemplary configuration, the database monitor 130 includes the SQL Guard application, marketed commercially by Guardium, Inc. of Waltham, Mass. Further details on nonintrusive database monitoring based on a security model may be found in copending U.S. patent application Ser. No. 10/762,660, filed Jan. 22, 2004, entitled "SYSTEM AND METHODS FOR ADAPTIVE BEHAVIOR BASED ACCESS CONTROL", incorporated herein by reference. In alternate configurations, the audit mechanism 126 may employ other processes or procedures for gathering audited requests 140', such as DBMS 114 features or interrogation of the database 112.

The data access requests 140 include data traffic requests 142 and operations including administrative and data manipulation commands 144 and tag commands 146. Data access requests 142 are typically SQL based instructions, such as queries, from users 120 to the database server 110. The data traffic requests 142 include instructions for retrieving, modifying and adding user data to the database. The metadata commands 144 emanate from a DBA 124 or other privileged operator for manipulating metadata that defines the structure, view or format of the data in the database 112.

In operation, the audit mechanism 126 intercepts, or receives, the data access requests 140 as audited requests 140', 140" for logging and analysis purposes such as security, transaction audit gathering and trending. Security usage identifies undesirable transactions and selectively blocks the selected transactions. Trending focuses on suspect usage patterns and highlights or optionally blocks such transactions. Audit data gathering usage collects data required for regulatory compliance as discussed above, such as identifying access trails to sensitive data. In particular configurations discussed herein, such audit data gathering includes tracking metadata changes resulting from administrative metadata commands 144 (commands), and tracking or correlating such changes with a tag label 148 from a tag command 146.

The administrative commands 144 (commands) may include schema changes and other modifications and updates to the structure or format of the data. Accordingly, it is desirable or mandatory to track such changes for maintaining an access trail to the data (or structure thereof, since metadata changes may have a substantive effect on the corresponding data). In the exemplary scenario, an administrative change request 160 specifies a particular change or result to the database 112. The administrative change request 160 is responsive to user requests, management mandates and/or functional requirements. In general, the commands 144 responsive to a change request 160 perform administrative and/or structural changes to the data, in contrast to user data traffic which generally retrieves and/or updates application data in the database 112. However, change request initiated commands 144 for reconciliation are not limited to metadata changes, and may include modifications to attributes and defaults, as well as application data. The change request 160 is typically in a paper or text (i.e. email) form or as an electronic document, and a DBA 124 identifies and specifies the particular database operations to effect the change request by identifying the metadata changes precipitated by the change request. In effect, therefore, the DBA 124 "translates" the change request 160 into a series of operations. Each operation is issued in the form of an command 144 to the database server, and is issued as a series of commands 144 corresponding to the change request 160.

Conventional change request 160 processing includes a manual or paper interface to reconcile the administrative database commands 144 with the change request 160 that comprises it. In contrast, configurations herein provide for a tag command having a context label 148, or tag, indicative of the corresponding change request 160. The DBA 124 issues the tag command 146 including the context label <TAG> 148 as a parameter for association with successive administrative metadata commands 144 to the database server 110. The audit mechanism 126 identifies the tag command 146 and generates a begin tag session log entry 162 corresponding to the context label 148 applicable to successively received commands 144 in the current session. The context label 148 is therefore a tag or other identifier indicative of the change request 160. The audit mechanism 126 generates a set of transaction records 164 associating the context label 148 with the administrative metadata commands 144 issued to correspond to the change request 160, as will be discussed further below. The audit mechanism 126 reads and identifies the administrative metadata commands 144, and associates them with the current context label 148 from the tag command 146.

Upon completion of the operations corresponding to the change request 160, the DBA 124 issues metadata tagging command 144 to end the session, and the audit mechanism 126 logs an end command 166 which ends the context and terminates the association of the context label 148 with the change request 160. The DB access log 134 therefore stores, for each change request 160, a sequence 164 of administrative database commands 144 each associated with the context label 148 identifying the change request 160 to which they are responsive.

Figure 3:
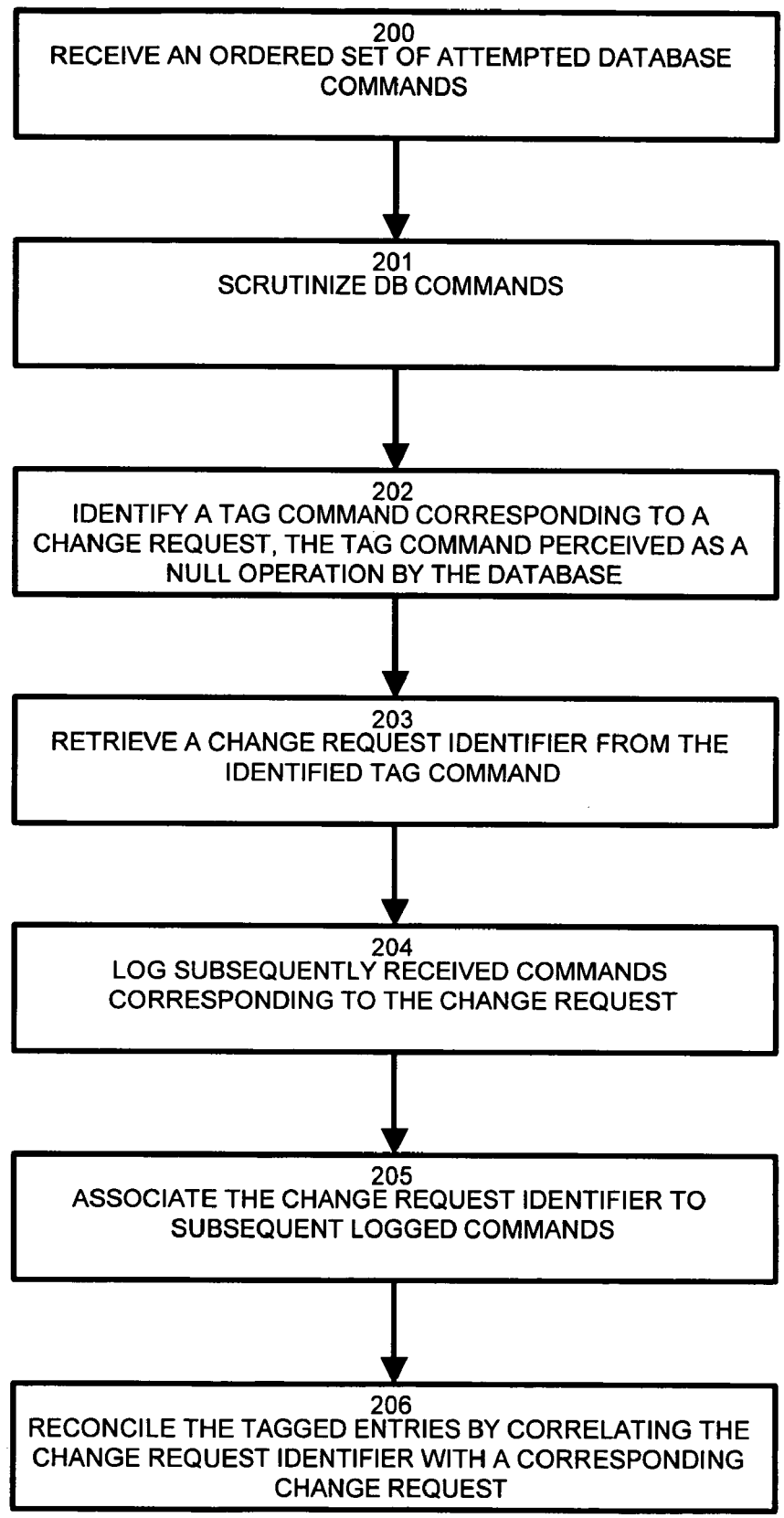
FIG. 3 is a flowchart of gathering and reconciling database change requests in the environment of FIG. 1.

FIG. 3 is a flowchart of gathering and reconciling database change requests in the environment of FIG. 1. Referring to FIGS. 1 to 3, the method of automatic reconciliation of change requests includes, at step 200, capturing an ordered set of attempted database requests 142, and scrutinizing DB commands for operations pertaining to administrative metadata changes (commands) 144 at step 201. The audit mechanism 126 intercepts, or reads the commands 140 issued from the network 122 to the database server 110. In an exemplary configuration, discussed below, the audit mechanism 126 may also allow the commands 140 to continue unimpeded to the server 110, effecting nonintrusive monitoring which avoids injecting overhead into the mainstream data access to the server 110, as disclosed in the copending U.S. patent application cited above.

At step 202, the audit mechanism 126 identifies a tag command 146 corresponding to a change request 160. The database server 110, since it also receives the tag command 146 due to the nonintrusive monitoring capabilities of the audit mechanism 126, may discard or ignore the tag command 146 as a null operation, thereby not processing or acting unnecessarily on the tag command intended for the audit mechanism 126, as will be discussed further below.

The audit mechanism 126 retrieves a change request identifier, or context label 148 from the identified tag command 146, as depicted at step 203. The context label 148 identifies the change request 160 to which the forthcoming set of commands corresponds to, and therefore enables reconciliation of the set of commands to the change request 160. As the commands 144 are received, the audit mechanism 126 logs the subsequently received commands 144 resulting in the administrative metadata changes corresponding to the change request 160, as depicted at step 204. The audit mechanism 126 also associates the change request identifier 148 to the subsequently logged commands 144 by logging the context label 148 along with the logged commands 144, as shown at step 205. Following receipt of the set of database commands 144, a reconciliation process reconciles the tagged entries by correlating the change request identifier, i.e. context label 148, with the corresponding change request 160 at step 206. Each of the logged commands 144 identifies the change request 160 which precipitated it because the context label 148 identifying the change request 160 is logged together as a change request record 164.

Figure 4:
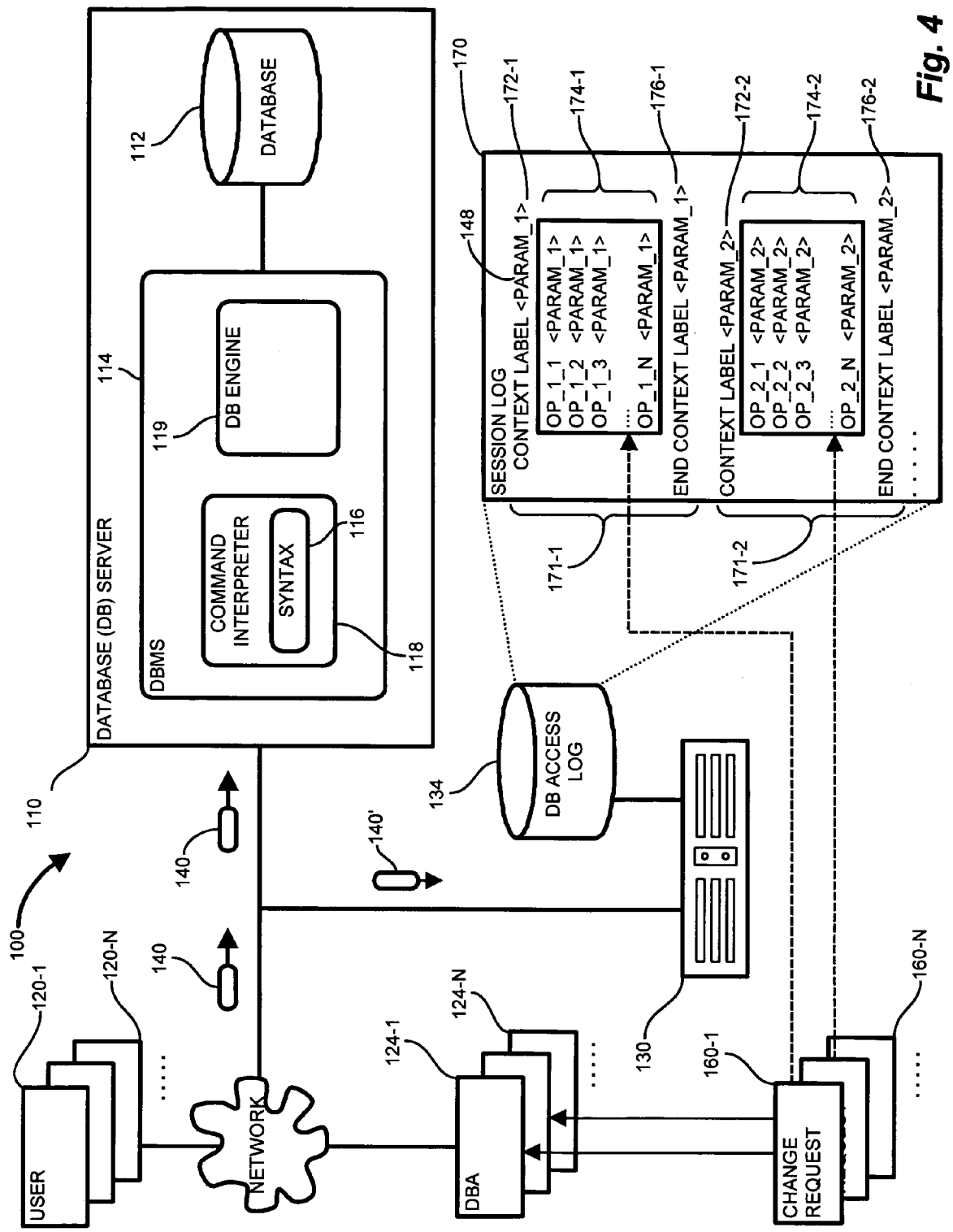
FIG. 4 is a block diagram of an audit server having a database monitor configuration suitable for gathering and reconciling database change requests as in FIG. 2.

FIG. 4 is a block diagram of an audit server 128 having a database monitor 130 configuration suitable for gathering and reconciling commands 144 based on database change requests 160 as in FIG. 3. Referring to FIGS. 3 and 4, in a typical environment 100, a plurality of DBAs 124-1 ... 124-N (124 generally) perform actions as described in a plurality of change requests 160-1 ... 160-N (160, generally). In operation, the database monitor 130 generates the database access log 134 having context sessions 171-1 ... 171-2 (171 generally) as part of a reconciliation session log 170. Each of the context sessions 171 includes a begin session indicator 172-1 ... 172-2 (172 generally) corresponding to the tag command 162, and including the context label 148. A series of performed operations 174-1 ... 174-2 (174 generally) follows, corresponding to each of the database commands 144 received during the session. The context session 171 records the associated performed operations 174 to log each command 144 issued corresponding to the change request 160. Each of the performed operations 174 includes the context label 148 intercepted as a parameter PARAM_1 ...

PARAM_2 in the previously intercepted tag command 146. The context label 148 association persists for the duration of the session log 171, and is terminated with an end context record 176-1 . . . 176-2 from the intercepted end session command 166.

In this manner, the database monitor 130 logs administrative metadata commands 144, issued during a context session 171 and resulting from a change request 160, as performed operations 174 associated with the context label 148 indicative of the change request 160 that precipitated them. A subsequent reconciliation operation to identify administrative database commands 144 issued responsively to a particular change order 160 is facilitated, and rogue operations not tied to any change request 160 are likewise automatically identified.

Figure 5:
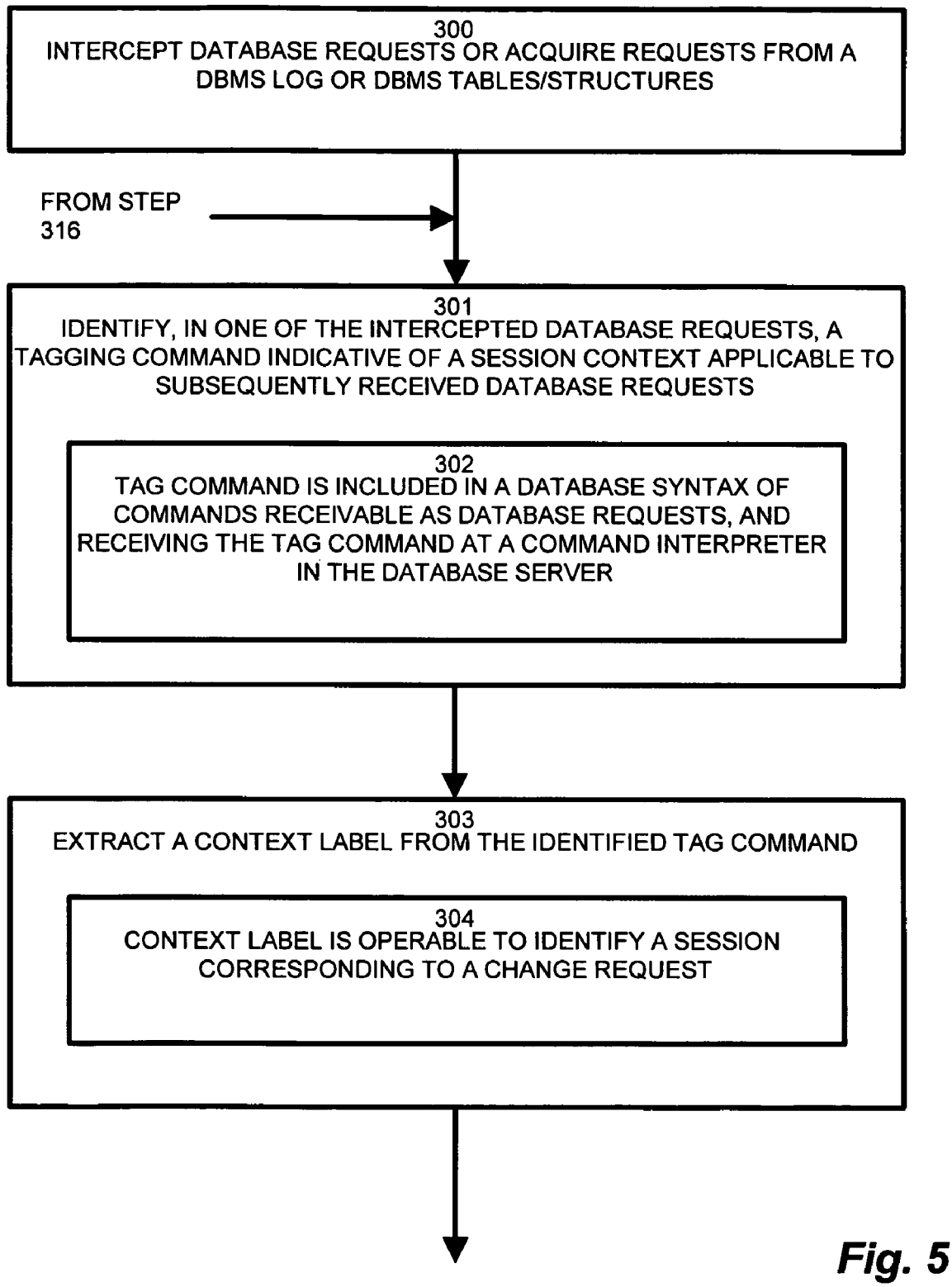
FIGS. 5-7 are a flowchart of the operation of the database monitor of FIG. 4 gathering and reconciling database change requests.
Figure 6:
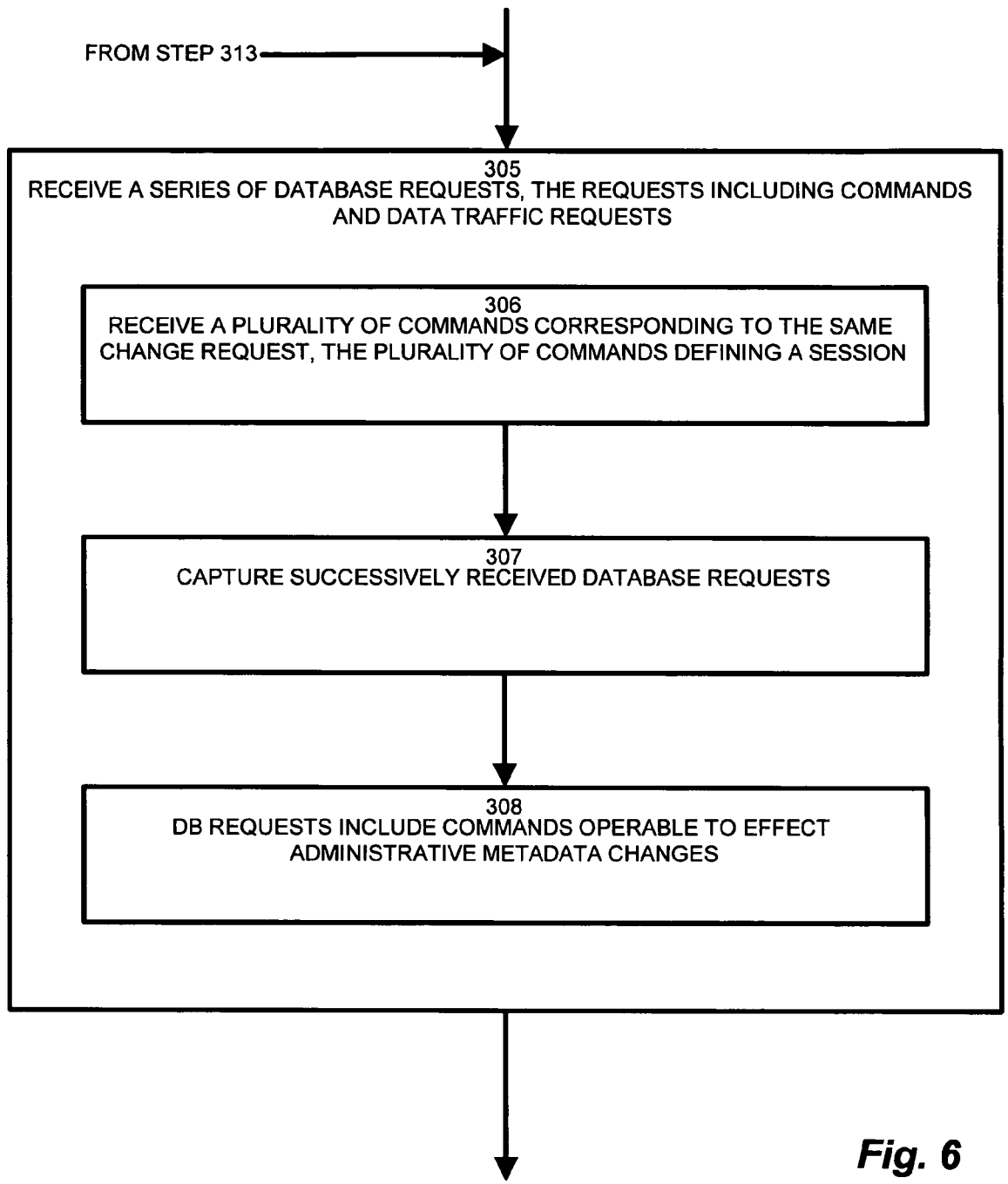
Figure 7:
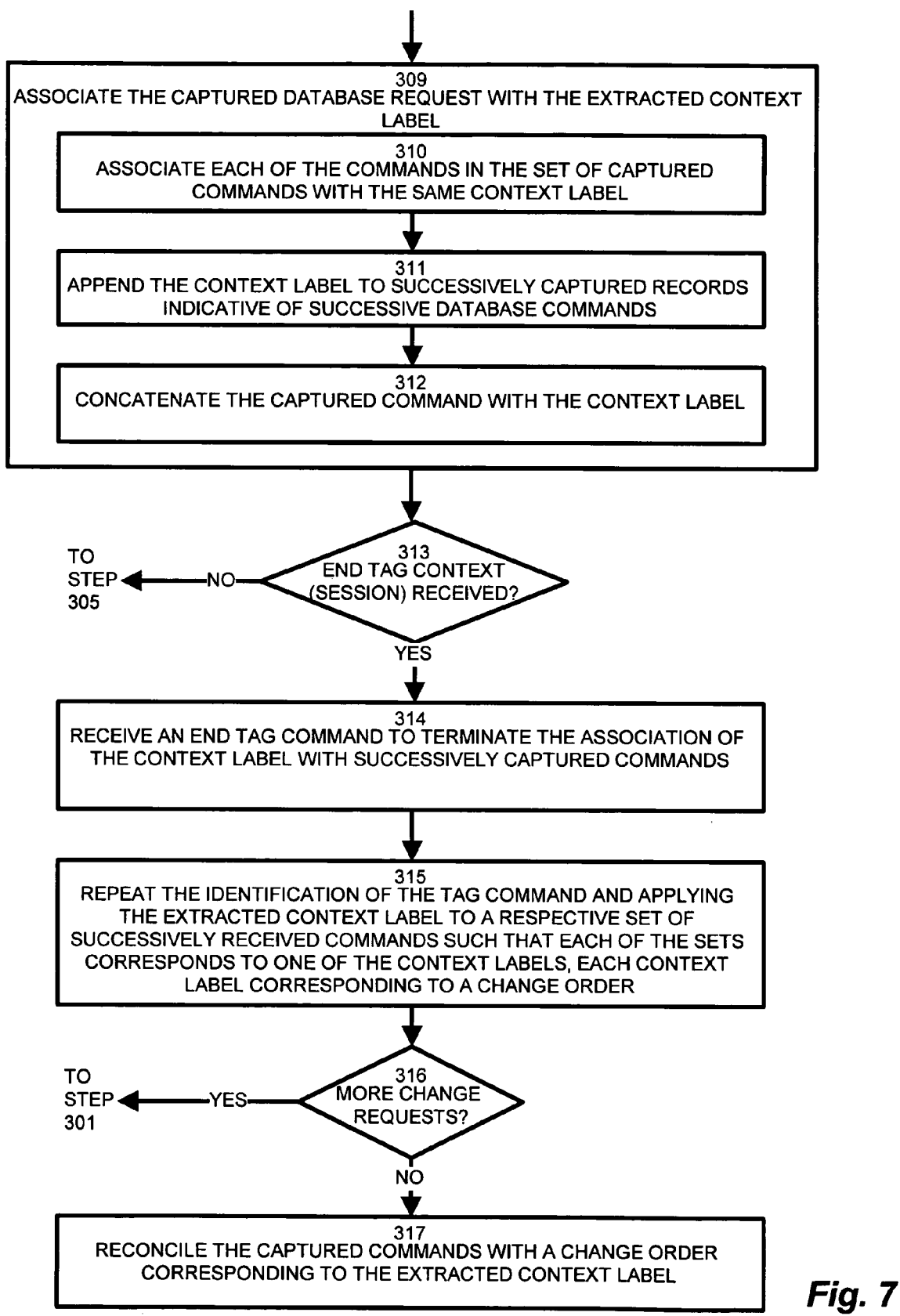

FIGS. 5-7 are a flowchart of the operation of the database monitor of FIG. 4 gathering and reconciling database change requests. Referring to FIGS. 1 and 3-7, the method for tracking database access patterns using the context label 148 association further includes, at step 300, intercepting or receiving, via the interface 132 or otherwise acquiring via a DBMS log or DBMS tables and/or structures, data access requests 140, and identifying, in one of the received database access requests, a tag command indicative of a session context 171 applicable to subsequently received database requests 140, as depicted at step 301.

The tag command 146 is included in a database syntax 116 of commands receivable as database access requests 140 by the database server 110. Therefore, the tag command 146 is part of the vocabulary of the command syntax 116 of the command interpreter 118 that receives each of the data access requests 140. Accordingly, the database server 110, at step 302, receives the tag command at the command interpreter 118 in the database server 110. In the database monitor 130 configuration, the command interpreter 118 may discard the tag command 146 in a benign manner as a null operation. In the course of intercepting data access requests 140 at the database monitor 130, the tag command 146 may be allowed to pass to the command interpreter 118 similar to the other data access requests 140 without resulting in undesired operation or undue overhead in a database engine 119. For example, a benign command to reconcile commands issued on behalf of business owner Jane responsive to change request # 22 might be select 'GuardAppEvent:Start',
   'GuardAppEventType:RECONCILE',
   'GuardAppEventUserName:Jane',
   'GuardAppEventStrValue:CHANGE REQUEST 22'
   in an exemplary SQL server or Sybase® implementation, and in an Oracle® environment, might read:
select 'GuardAppEvent:Start',
   'GuardAppEventType:RECONCILE',
   'GuardAppEventUserName:Jane',
   'GuardAppEventStrValue:CHANGE REQUEST 22' from DUAL Upon intercepting the tag command 146, the database monitor 130 extracts the context label 148 from the identified tag command 146, as shown at step 303. The context label 148 identifies the change request 160. In the exemplary configuration, the context label 148 is operable to identify the session 171 corresponding to the change request 160, as depicted at step 304. Alternatively, the context label 148 may be employed for other purposes to insert the tag in the DB access log 134 in association with other audited (intercepted) data access requests 140'.

Since the database monitor 130 intercepts or receives each data access request 140, the database monitor 130 receives a series of audited requests 140', as depicted at step 305. At step 306, the database monitor 130 receives a plurality of commands 144 corresponding to the same change request, such that the plurality of commands 144 belonging to actions (i.e. operations) performed while implementing the change request 160 defines a session 171 of commands 144. The change request 160 typically results in a plurality, or set 164 of commands 144. Each command 144 initiates a database operation for effecting the change request 160. The change requests 160 generally trigger commands 144 to the metadata, not traffic requests 142 to retrieve or update data.

At step 307, the database monitor continues capturing successively received database requests 140. Since the database monitor 130 intercepts general database traffic over the connection or interface 132, capturing or receiving the database requests 140 may include intercepting the data access requests 140 in a nonintrusive manner. In this respect, the interface 132 provides the database monitor 130 with the data access requests 140 independently of the database server 110, thereby not interfering or burdening the data flow within the database server 110 with the receipt or interception of the data access requests 140. The received data access requests 140" include commands operable to make administrative metadata changes per the corresponding change request 160, as depicted at step 308. It should be noted that while the data traffic requests 142 generally are not part of the logged commands 144 corresponding to the change requests 160, the database access monitor 130 nonetheless processes such traffic accordingly, including but not limited to the methods discussed in the copending patent application cited above.

Upon intercepting a command 144, the database monitor 130 associates the captured database request 140 with the extracted context label 148 previously received in the corresponding tag command 146 at the beginning of the set of commands 144 triggered by the change request 160, as shown at step 309. Accordingly, the database monitor 130 associates each of the commands 144 in the set of captured commands 164 with the same context label 148, as depicted at step 310.

The database monitor 130 may employ one of several mechanisms to associate the commands 144 with the context label 148 in the session log 170. At step 311, the database monitor 130 appends the context label 148 to successively captured records indicative of successive database commands 144. In the exemplary arrangement, associating includes concatenating the captured command 144 with the context label, such as in a text based log file, as depicted at step 312. In alternate configurations, other implementations of associating the context label 148 with captured data access requests 140 may be performed, such as pointer or index based approaches.

The database monitor 130 performs a check, at step 313, to determine if the end tag context (session) command 166 was received from the DBA 124. If not, then control reverts to step 305 to receive the next command 144 in the set of commands 164. Otherwise, then the database monitor 130 receives the end tag command 166 to terminate the association of the context label 148 with successively captured commands 144, as shown at step 314. Typically this implies that the DBA 124 has entered all commands 144 corresponding to the operations required by the particular change request 160. The database monitor 130 repeats the identification of the tag command 146 and applies the extracted context label 148 to a respective set 164 of successively received commands such that each of the sets 164 corresponds to one of the context labels 148, in which each context label 148 corresponds to a change request 160, as depicted at step 315. Therefore, the typical scenario may include entry of commands 144 corresponding to several change requests 160, in which each change request receives a unique context label 148 distinguishing the commands, or database operations, corresponding to it.

A check is performed, at step 316, to determine if there are more change requests to be entered by the same or other DBAs. If so, then control reverts to step 301 to allow entry of another tag command 146. Otherwise, the reconciliation process commences reconciling the captured commands 144 with a change request 160 corresponding to the extracted context label 148, as depicted at step 317. As indicated above, each command 144 should correspond to a change request 160 and be associated to that change request 160 in the session log 170. The reconciliation process may be a manual inspection or automated processing of the context session 171. However, each command 144 issued by a DBA 124 should be associated to a logged context label 148 to allow the resulting operation to be tracked to the triggering change request, thus maintaining the audit trail.

Those skilled in the art should readily appreciate that the programs and methods for automatic reconciliation of change requests as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for automatic reconciliation of change requests has been particularly shown and described with references to embodiments thereof, it will be understood by those skilled in the art that various changes in form and details may be made therein without departing from the scope of the invention encompassed by the appended claims.

What is claimed is:

1. A method for tracking database access patterns to a database server comprising:
  receiving database commands pertaining to metadata changes in the database, wherein the received database commands include one or more sets of commands with the commands of each set collectively performing a corresponding desired data modification for a database;
  identifying, from the database commands, a tag command initiating a log tagging for a subsequently received set of database commands that collectively perform a desired data modification for the database, the tag command included in a recognized syntax of database commands received as database requests by a database server, further comprising:
    receiving the tag command indicating a start of a session context at a command interpreter in the database server; and
    recognizing the tag command as initiating the session context for the subsequently received set of database commands that collectively perform the desired data modification for the database, the session context defined by the set of database commands performing the desired data modification and encapsulated between the received start context and an end context command;
  extracting a tag identifier from the identified tag command, the tag identifier for identifying the session context, and discarding the tag command in a benign manner as a null operation so as not to cause undesirable operation by the database server;
  capturing successively received database commands of the set, the captured database commands for performing metadata changes and collectively performing the desired data modification of the database, the encapsulated database commands corresponding to a particular session defined by operator activity on a terminal device; and
  associating the captured received commands to generate tagged entries by recording the captured database commands of the set as logged commands with the extracted tag identifier, wherein the extracted tag identifier identifies the logged commands as the set of commands within the received database commands that is associated with and performs the desired data modification for the database.

2. The method of claim 1 wherein associating further comprises:
  associating the tag identifier to the logged commands by logging the tag identifier as a context label along with the logged commands; and
  following receipt of the set of database commands, reconciling the tagged entries by correlating the tag command with a corresponding change request indicating the desired data modification for the database, reconciling providing that each of the logged commands identifies the change request which precipitated it such that the context label identifying the change request is logged together as a change request record.

3. The method of claim 2 wherein receiving database commands pertaining to metadata changes in the database further comprises:
  logging administrative metadata commands issued during the session context associated with the context label, the context label indicative of a change request that precipitated the metadata changes such that rogue operations not tied to any change request are identified.

4. The method of claim 2 wherein receiving database commands further comprises intercepting general database traffic over a passive interface, including intercepting the database commands in a nonintrusive manner such that the interface provides a database monitor with the database commands independently of the database server to avoid burdening data flow within the database server with the interception of the database commands.

5. A method for automatic reconciliation of change requests comprising:
  receiving database requests, wherein the received database requests include one or more sets of database requests with each set performing a corresponding desired data modification for a database;
  identifying, in one of the received database requests, a tag command for initiating a session context for a subsequently received set of database requests that collectively perform a desired data modification for the database;
  extracting a context label identifying the session context from the identified tag command, the tag command included in a recognized syntax of database commands received as database requests by a command interpreter in a database server, further comprising:

receiving the tag command indicating a start of the session context at a command interpreter in the database server;

recognizing the tag command as initiating the session context for the subsequently received set of database requests that collectively perform the desired data modification for the database, the session context defined by the set of database requests performing the desired data modification and encapsulated between the received start context and an end context command; and discarding the tag command in a benign manner as a null operation so as not to cause undesirable operation by the database server;

capturing successively received database requests of the set, the captured database requests being database commands for performing metadata changes and the desired data modification for the database, the encapsulated commands corresponding to a particular session defined by operator activity on a terminal device; and associating the captured database requests of the set with the extracted context label, wherein the extracted context label identifies the associated database requests as the set of database requests within the received database requests that is associated with and performs the desired data modification for the database.

6. The method of claim 5 wherein the database requests include at least one of:

commands to effect metadata or data changes; and data traffic requests to effect updates and retrievals of stored database entities.

7. The method of claim 6 wherein the context label identifies a session corresponding to a change request.

8. The method of claim 7 further comprising:

receiving a plurality of commands corresponding to the same change request, the plurality of commands defining a session of commands; and associating each of the commands in the plurality of received commands with the same context label.

9. The method of claim 8 wherein associating further comprises appending the context label to successively captured records indicative of successive database requests.

10. The method of claim 5 wherein capturing the database requests further comprises intercepting, in a nonintrusive manner, commands pertaining to metadata changes in the database.

11. The method of claim 5 wherein receiving the database requests is performed in a nonintrusive manner via intercepting the database requests from an interface to the database server.

12. The method of claim 11 wherein associating further comprises concatenating the captured database request with the context label.

13. The method of claim 12 further comprising repeating the identification of the tag command and applying the extracted context label to a respective set of successively received database requests such that each of the sets corresponds to one of the context labels, each context label corresponding to a change request.

14. A method for automatic reconciliation of change requests with database operations comprising:

reading, from audited requests maintained by a database server, an ordered set of attempted database commands, wherein the database commands include one or more sets of commands with each set associated with a change request and performing a corresponding desired data modification for a database;

identifying, from the database commands, a tag command corresponding to a change request for a desired data modification for the database, the tag command included in a recognized syntax of database commands received as database requests by a database server, further comprising:

receiving the tag command at a command interpreter in the database server;

recognizing the tag command as initiating a session context for a subsequently received set of database commands that perform the desired data modification of the corresponding change request, the session context defined by the set of database commands performing the desired data modification and encapsulated between a received start context and an end context command; and discarding the tag command in a benign manner, the tag command perceived as a null operation so as not to cause undesirable operation by the database server;

retrieving a change request identifier from the identified tag command;

logging subsequently received database commands of the set corresponding to the change request, the subsequently received database commands for performing metadata changes and collectively performing the desired data modification of the corresponding change request, the encapsulated database commands corresponding to a particular session defined by operator activity on a terminal device; and associating the change request identifier to the subsequent logged commands via the session context, wherein the change request identifier identifies the logged commands as the set of commands within the received database commands that is associated with the corresponding change request and performs the desired data modification for the database.

15. The method of claim 14 further comprising:

reconciling the logged commands by correlating the change request identifier with a corresponding change request; and flagging logged commands for which a corresponding change request identifier is unavailable.

16. A database monitor having a set of instructions on a computer readable storage medium that, when executed by a computer, perform a method for monitoring data access requests for automatic reconciliation of change requests to a database, the monitor comprising:

an interface for receiving data access requests, wherein the received data access requests include one or more sets of data access requests with each set performing a corresponding data modification for a database, the database monitor operating to identify, in one of the received data access requests, a tag command indicative of a start of a session context applicable to subsequently received data access requests of a set performing a desired data modification for the database, the tag command included in a recognized syntax of database commands, and further operating to:

recognize the tag command as a start context command for initiating a session context for the subsequently received set of data access requests, the session context defined by the set of data access requests encapsulated between the received start context and an end context command; and
extract a context label from the identified tag command; and
a database access log responsive to the database monitor for capturing successively received data access requests of the set, the captured database requests of the set being database commands for performing metadata changes and collectively performing the desired data modification of the database, the encapsulated database commands corresponding to a particular session defined by operator activity on a terminal device, and further for storing an association of the captured data access requests of the set with the extracted context label, the context label identifying a change request session corresponding to a change request indicating the desired data modification for the database and to identify the associated data access requests as the set of data access requests within the received data access requests that is associated with the change request and performs the desired data modification, the database monitor receiving data access requests in the identified session until receiving a successive tag command indicative of termination of the set and change request session, the tag commands selected to be logged for encapsulating and identifying the database commands received for the change request session without incurring additional change operations by the database monitor so as not to cause undesirable operation by the database monitor.

17. The database monitor of claim 16 wherein the interface is further operating to intercept at least one of:
commands to effect administrative metadata changes pertaining to metadata changes in the database; and
data traffic requests to effect updates and retrievals of stored database entities.

18. The database monitor of claim 17 wherein the interface is an interface to a network connection to receive the data access requests independently of a database server.

19. The database monitor of claim 17 wherein the interface receives a plurality of commands corresponding to the same change request, the plurality of commands defining a session of commands, the database monitor further operating to associate each of the commands in the plurality of commands with the same context label.

20. The database monitor of claim 16 wherein the tag command is included in a database syntax of commands received as database requests by a database server operating to:
receive the tag command at a command interpreter in the database server; and
discard the tag command in a benign manner as a null operation.

21. A computer program product having a computer readable storage medium to store computer program logic embodied in computer program code encoded thereon, the computer program code received by a processor that, when executed by the processor, cause the computer to perform steps for automatic reconciliation of change requests comprising:
recording database requests received by DBMS tables in a database server, wherein the recorded database requests include one or more sets of database requests with each set performing a corresponding desired data modification for a database;
identifying, in one of the recorded database requests, a tag command indicative of a start of a session context applicable to a subsequently received set of database requests that collectively perform a desired data modification for the database, the tag command included in a recognized syntax of database commands received by a command interpreter in the database server;
recognizing the tag command as initiating the session context for the subsequently received set of database requests, the session context defined by the set of database requests performing the desired database modification and encapsulated between the received start context and an end context command;
extracting a context label identifying the session context from the identified tag command;
capturing successively received database requests, in the identified session until receiving a successive tag command indicative of termination of the set and session, the captured database requests being database commands for performing metadata changes and collectively performing the desired data modification of the database, the encapsulated commands corresponding to a particular session defined by operator activity on a terminal device, the tag commands selected to be logged for encapsulating and identifying the commands received in the session without incurring additional change operations by the database server so as not to cause undesirable operation by the database server;
scrutinizing the received database requests for operations pertaining to administrative changes;
associating the captured database requests of the set with the extracted context label, wherein the context label identifies the associated database requests as the set of database requests within the received database requests that is associated with and performs the desired data modification for the database;
reconciling the logged commands by correlating the context label with a corresponding change request indicating the desired data modification for the database; and
flagging administrative metadata changes of database requests for which a corresponding context label is unavailable.

22. A method for auditing a change request session for reconciling with a particular context comprising:
receiving a set of database change requests, each change request including a set of database commands for collectively defining an organizational change to a database via metadata changes;
identifying, in one of the received database change requests, a tag command indicative of a start of a session context applicable to a subsequently received set of database commands for that change request, the tag command included in a recognized syntax of database commands received by a command interpreter in a database server, the tag command for encapsulating the set of database commands in the database change request as a change request session for later reconciliation with a change log;
recognizing the tag command as a start context command initiating a session context of received commands, the session context defined by the set of database commands encapsulated between the received start context and an end context command;
extracting a context label from the identified tag command, the context label indicative of the session context;
capturing successively received database commands until receiving a successive tag command indicative of termination of the set and change request session, the captured database commands being for performing metadata changes and collectively defining the organizational change, the encapsulated commands corresponding to a particular session defined by operator activity on a terminal device, the tag commands selected to be logged for encapsulating and identifying the commands received in the change request session without incurring additional operations by a database server so as not to cause undesirable operation by the database server; and associating the database change request with the extracted context label for identifying, for each database change request, the corresponding session context and the set of database commands associated with that change request for providing an audit trail of database changes.

23. The method of claim 22 wherein the tag commands include commence context and terminate context, and are selected to be logged to encapsulate the commands fulfilling the change request without causing undue operation by the database server, further comprising:

discarding, by the database server, the tag commands encapsulating the session context.

* * * * *